United States Patent Office 3,644,589
Patented Feb. 22, 1972

3,644,589
METHOD OF IMPARTING SELF-EXTINGUISHING FLAME PROPERTIES TO IMPACT-MODIFIED POLYVINYL CHLORIDE
Earnest Moore, Akron, and George H. Wear, Mogadore, Ohio, assignors to The General Tire & Rubber Company
No Drawing. Filed Mar. 13, 1969, Ser. No. 807,091
Int. Cl. C08f 45/62
U.S. Cl. 260—890
1 Claim

ABSTRACT OF THE DISCLOSURE

This invention concerns a method of imparting self-extinguishing flame properties to impact-modified polyvinyl chloride based resins by the step of adding to the resin a compound selected from the group consisting of organotin maleates, organotin mercaptides, stannous oxide, and mixtures thereof.

BACKGROUND OF THE INVENTION

Field of the invention

This invention relates to the field of vinyl halide polymers. More particularly, this invention relates to impact-modified polyvinyl chloride resins and to a method of imparting self-extinguishing flame properties to them.

Description of the prior art

As plastics replace other materials of construction, there is a corresponding risk that these plastics will become involved in fires. Whereas in the case of other materials of construction, such as wood and brick that structurally fail in a fire, plastics may not only structurally fail but many times add to the intensity of the fire and promote even more hazardous conditions. Generally, plastics are combinations of the elements carbon and hydrogen and are extremely flammable. Intense heat in a fire can break down the plastic into its elements or, far worse, produce other compounds of a far more hazardous nature such as choking black smoke, toxic fumes, and explosive vapors.

As a result of some fires involving large amounts of plastics and the hazardous conditions encountered, there is a growing awareness by segments of industry that plastics must be made safer. An example of such an awareness is a recent requirement of a large aircraft manufacturer to the effect that ". . . (plastic) sheets 0.30 inch thick or more shall be self-extinguishing within five seconds after removal of (a primary) flame . . ."[1].

Most plastics, and many other materials as well, will flame or burn when held directly in a primary flame such as that of a Bunsen burner. This is understandable for plastics and in most cases is difficult to change because of their organic nature. Many plastics, however, continue to burn when the primary flame is removed—this is termed secondary burning. It is this latter property that industry is attempting to eliminate.

A plastic having self-extinguishing properties will burn in the presence of a primary flame, however, it ceases burning within some relatively short time upon removal from the flame. The benefits derived from self-extinguishing plastics may be exemplified by visualizing an aircraft accident wherein flaming fuel has entered the passenger compartment. Plastics without self-extinguishing properties would continue to burn after the flaming fuel was doused; on the other hand, self-extinguishing plastic would cease all burning upon the dousing of the flaming fuel. It is readily seen, therefore, that imparting self-extinguishing flame properties to plastics may result in savings of property and lives and, as such, is extremely desirable.

One of the most widely used plastics, and the general subject of this invention, is the halogenated vinyl polymer known as polyvinyl chloride (PVC). As its name indicates, polyvinyl chloride resin contains chlorine in the basic molecule. Chlorine is a well-known fire retardant and its presence renders the resin nonburnable and self-extinguishing. Unfortunately, polyvinyl chloride resin does not possess sufficient physical properties to permit its use in many semi-structural applications; the primary weakness being its low impact strength and low heat distortion temperature. Efforts to improve these properties involve the addition of materials (mostly flammable materials) that dilute PVC to the point where the chlorine is no longer effective.

Impact strength is the property of withstanding impacts; for semi-structural applications such as seat backs, arm rests, head rests, and serving trays, the impact strength must be great enough to permit the item to stand up under day-to-day useage.

Heat distortion temperature is an indication of the cold-flow and stress-creep properties of the resin. In the semi-structural applications mentioned above, the resin must have a sufficiently high heat distortion temperature so that the seat backs and arm rests do not warp under load (usage). In addition, a high heat distortion temperature insures that the plastic part will maintain its original shape throughout exposure to heat such as from sunshine and radiation from nearby electro-mechanical devices.

Impact-modifying resins of various compositions are added to polyvinyl chloride resin to increase impact strength and heat distortion temperature. These modifying resins may be homopolymers, copolymers, terpolymers, etc. and are added to the resin during the compounding or mixing stage. By compounding is meant that the powdered polyvinyl chloride resin is placed in a mixer or on a mill and other materials such as lubricants, heat stabilizers, pigments, and impact-modifying resins added. The material is blended together under high shear so that the generated heat melts the compounds into a homogeneous, pliable mass. Thereafter, the homogeneous material is subjected to a variety of processes such as calendering into sheets, extruding and dicing, pelletizing, flaking, and injection molding. It is generally these impact-modifying resins that make the normally self-extinguishing polyvinyl resin highly flammable.

Heretofore, plastics were made somewhat self-extinguishing by the addition of various chemical compounds such as antimony oxide, halogens, and phosphites. The self-extinguishing effect of antimony oxide is directly proportional to the quantity used; as self-extinguishing requirements are being tightened, the increased amount of antimony oxide becomes a noticeable cost factor and detrimental to overall physical properties. The self-extinguishing effects of halogens are limited because high intensity primary burning releases nascent halogen vapors that are many times more hazardous than the fire sought to be extinguished. The self-extinguishing properties of phosphites are many times overshadowed by the detrimental effect they have on the resin's physical properties.

The basis of this invention is the discovery of a class of compounds that may be added to impact-modified polyvinyl chloride resins to impart an extremely high degree of self-extinguishment. This class of compounds is compatible with a wide range of impact-modifying resins; promotes this synergestic self-extinguishing flame property with polyvinyl chloride resins of all molecular weights; imparts this self-extinguishing property when used in very ---
[1] Douglas Material Specification DMS-1631J, paragraph 4.5.7, McDonnal Douglas Corporation, Aug. 15, 1968.

small amounts; and is compatible with and easily compounded into all polyvinyl chloride resins.

An object, therefore, of this invention is a method of imparting self-extinguishing flame properties to impact-modified polyvinyl chloride resins. Another object of this invention is a method of imparting to polyvinyl chloride resins, of all molecular weights and modified with an impact-modifying resin in amounts in excess of 60 parts/100 parts (polyvinyl chloride and impact-modifying) resin, an extremely high degree of self-extinguishment by one addition of certain materials, hereinafter described, at levels lower than other such agents of the prior art. These and other objects of this invention will become more apparent upon reading the preferred embodiments and examples hereinafter set forth. The description of the preferred embodiments and the examples show one skilled in the art how to practice this invention and are not to be construed either singly or in combination as placing a limitation thereon.

SUMMARY OF THE INVENTION

This invention concerns a method of imparting self-extinguishing flame properties to a polyvinyl chloride based resin, that is modified with an impact strength-modifying resin in amounts up to and in excess of 60 parts/100 parts (polyvinyl chloride and impact-modifying) resin, comprising adding to the polyvinyl chloride resin a compound selected from the group consisting of organotin maleates, organotin mercaptides, stannous oxide, and mixtures thereof.

DESCRIPTION OF THE PREFERRED EMBODIMENTS

As used hereinafter, the term "resin" is to mean the powdered plastic materials both prior to compounding and after being processed into a finished item. Therefore, the term "polyvinyl chloride resin" will be used to describe the powdered resin prior to compounding with impact-modifying resins, lubricants, stabilizers, pigments, etc., and also to describe the finished plastic sheet or structure made therefrom. For example, a 0.030 inch (30 mil) thick sheet of calendered, impact strength-modified polyvinyl chloride plastic will be termed "resin" throughout this application.

This invention contemplates polyvinyl chloride resins, impact-modified polyvinyl chloride resins, blends of polyvinyl chloride and other resins, and blends of impact-modified polyvinyl chloride and other resins where, in the blends, the polyvinyl chloride or impact-modified polyvinyl chloride resin is the major component. Examples of polyvinyl chloride or impact-modified polyvinyl chloride and other resin blends are 90/10: polyvinyl chloride/vinyl acetate blends, 95/5: vinyl chloride/polypropylene blends, and 87/13: impact-modified polyvinyl chloride/methyl methacrylate blends.

Also as used hereinafter, the term "self-extinguishing" is the property of a resin that causes it to cease burning almost instantly, i.e., within a few seconds, after removal from a primary flame. The test to determine the degree of self-extinguishment in this invention is to hold a sheet of extruded or calendered resin vertically in a primary flame for twelve seconds. The sheet is then removed from the flame and the number of seconds the secondary burning (flaming) continues is measured along with measurement of the vertical height of the charred area. These values are reported as "flame time (seconds)" and "char length (inches)". Generally, according to this invention, a polyvinyl chloride resin of virtually any molecular weight is compounded, according to practices well-known in the art such as milling and Banbury mixing, with impact-modifying resins (hereinafter described), lubricants, stabilizers, pigments, etc., and the novel self-extinguishing agents of this invention. The use of these self-extinguishing agents, hereinafter described, will render resin compounds and items made therefrom fully self-extinguishing wherein the thicknesses of the polyvinyl chloride resin exceeds about 20 mils.

Noteworthy in this respect is the fact that virtually all applications of polyvinyl chloride resins for semi-structural and decorative purposes utilize the resins in thicknesses greater than 30 mils. Thus, by rendering polyvinyl chloride resins self-extinguishing in thicknesses down to 20 mils, virtually all polyvinyl chloride resin construction materials profit by this invention.

Also noteworthy in this respect is the fact that polyvinyl chloride resins are impact-modified with from about 30 parts/100 parts (polyvinyl chloride and impact-modifying) resin up to about 50 parts of impact-modifying resin. Higher levels of impact-modifying resin are rarely used as the cost of the modifying resin is generally quite expensive compared to polyvinyl chloride. There may be, however, a desire to use a polyvinyl chloride resin that is modified with greater than 50 parts of impact-modifying resin; this invention is operative in this extreme range. As the examples show, this invention imparts self-extinguishing properties to polyvinylchloride resins modified in excess of 60 parts of modifying resin.

The novel compounds that impart the high degree of self-extinguishment according to this invention comprises tin containing compounds of the class consisting of organotin maleates, organotin mercaptides, stannous oxide and mixtures thereof. Many of these materials are commercially available, usually in the form of fine powders.

Although not fully understood, it is theorized that the self-extinguishing flame properties imparted to polyvinyl chloride resins by these materials are caused by a complexing reaction between the tin and the burnable components of the impact-modified polyvinyl chloride resin.

In the practice of this invention, a polyvinyl chloride resin is compounded with stabilizers, lubricants, pigments, impact-modifying resins, and the self-extinguishing compounds of this invention and processed in ways well-know in the art such as Banbury mixing, calendering, milling, pelletizing, extruding, and injection molding. In the examples following, the blended materials were mixed on hot two roll mill and calendered into sheets of various thicknesses.

Polyvinyl chloride resins are obtainable in various molecular weights to provide a wide range of physical properties for different applications. Generally, lower molecular weight polyvinyl chloride resins are easier to process, i.e., Banbury mix, mill, and calender, than are the higher molecular weight resins whereas the higher molecular weight resins exhibit higher physical properties such as higher tensile strength. This invention is operable with low, medium, and high molecular weight polyvinyl chloride resins and mixtures thereof as will be demonstrated in the following examples.

Polyvinyl chloride resins are also obtainable in various particle sizes depending upon the method of manufacture such as emulsion, suspension, and bulk polymerization. This invention contemplates the use of resins of all these particle sizes.

Stabilizers are blended with the resin to provide heat stabilization during mixing and subsequent processing. Generally, in processing polyvinyl chloride resin, the temperature of the resin is raised to its fusion point so that the individual resin particles will soften and fuse together into a homogeneous mass. Slightly above the fusion temperature, polyvinyl chloride begins to degrade, i.e., chlorine atoms bound to the basic molecule begin to split off due to molecular activation caused by heat input. These chlorine atoms combine with free water vapor and hydrogen to form hydrochloric acids that in turn attack the carbon-to-carbon double bonds in the base molecule. Because the fusion temperature and degradation temperature are so close together, some degradation invariable occurs during processing. Heat stabilizers are therefore added to the resin to complex with these free chlorine atoms and prevent subsequent attack and degradation of the polymer.

Small quantities of lubricants are blended with the resin to reduce friction to a level consistent with good processing and give satisfactory surface characteristics to the finished product. These lubricants generally take the form of high melting soaps such as long-chain fatty acid salts of various metals.

Pigments, such as titanium dioxide, are added to give color to the final product.

Impact strength-modifying resins are blended with the polyvinyl chloride compound to improve the impact strength and heat distortion temperature of the final item as described earlier. These resins come in a wide variety of chemical compositions; of all impact-modifying resins presently used, such as acrylic resins, chlorinated polyethylene resins, methyl methacrylate resins, and acrylonitrile-butadiene-styrene (ABS) resins, ABS resins offer the best impact-modifying characteristics to polyvinyl chloride resin at the lowest cost and with the least detrimental effect on heat distortion temperature.

To this blend of polyvinyl chloride resin, stabilizer, lubricant, pigment, and impact-modifying resin, and other compounds if desired, are added the self-extinguishment agents of this invention. These agents comprise a class of materials consisting of organotin maleates, organotin mercaptides, stannous oxide and mixtures thereof. An example of an organotin maleate usable herein is a dialkyl tin maleate such as di-butyl-tin maleate. An example of an organotin mercaptide is an organosalt of a mercapto carboxylic acid such as the reaction product of dibutyl tin oxide and 3 - mercapto propionic acid. Stannous oxide, of course, exists in only one configuration depicted by the chemical formula SnO. As the examples show, the self-extinguishing agents of this invention are effective over a wide range of addition. It is preferred to employ these agents at a level of at least 2.0 parts per 100 parts (polyvinyl chloride and impact strength-modifying) resin to minimize their cost, provide proper heat stability during processing, and yet maintain their outstanding self-extinguishing properties.

Each of these compounds by itself will impart the self-extinguishing flame properties desired, however, it was found during tests conducted with these materials that the sale use of an organotin mercaptide generated certain processing difficulties. In respect thereto, one of the preferred embodiments of this invention is the use of an equal part ratio of an organotin maleate and an organo mercaptide, i.e., a whole or fractional part of an organotin maleate and an equal part of an organotin mercaptide. This preferred embodiment provides the desired self-extinguishing flame properties with the most desirable processing conditions and long term heat stability.

Another preferred embodiment of this invention is the mixture of stannous oxide with either an organotin maleate or an organotin mercaptide or both. This latter preferred embodiment imparts self-extinguishing flame properties to polyvinyl chloride resins that are impact-modified in excess of 60 parts/100 parts (ployvinyl chloride and impact-modifying) resins.

A meritorious feature of this invention, aside from the unique flame extinguishing properties imparted thereby, is the fact that these compounds act as heat stabilizers during processing of the polyvinyl chloride resin. This unique coupling of properties lessens the total cost of self-extinguishing plastics because, under the teachings of this invention, no extra stabilizer need be added beyond the compounds taught herein and these compounds take the place of prior art heat stabilizers during processing of the resin.

Another feature of this invention is that the self-extinguishing flame properties imparted to polyvinyl chloride resins by this invention remain unchanged even when the resin is extended with fillers or reinforced with fibers. This feature finds particularly utility in the relatively recent development of fiber-reinforced thermoplastic materials in which polyvinyl chloride resins are considered outstanding materials.

The following examples are hereinafter set forth to demonstrate the unique self-extinguishing properties imparted by these materials over the prior art polyvinyl chloride resin formulations; the use of these novel self-extinguishment agents with a wide range of impact-modifying resins; the use of these agents with polyvinyl chloride resins of various molecular weights; the effect of these self-extinguishing agents in polyvinyl chloride resins processed into thicknesses greater than about 20 mils; and the effectiveness of these self-extinguishing agents by themselves and in various mixtures. All parts are parts by weight unless otherwise indicated; all footnotes appear at the end of Example 6.

EXAMPLE 1

A low molecular weight polyvinyl chloride resin was compounded with an acrylonitrile - butadiene - styrene (ABS) impact-modifying resin and other materials according to the formulas below, calendered into 30 mil sheets, and subjected to flame tests. The results of the flame tests are shown below:

| | A | B | C | D | E | F |
|---|---|---|---|---|---|---|
| PVC resin [1] | 70 | → | → | → | → | → |
| Impact modifier [2] | 30 | → | → | → | → | → |
| Stabilizer [3] | 5 | → | → | → | → | → |
| Lubricant [4] | 1 | → | → | → | → | → |
| Antimony oxide | | 5 | | | | |
| Tetra bromobisphenol | | | 5 | | | |
| Perchloropentacyclodecane (65% Cl) | | | | 5 | | |
| Tris (2,3)-dibromopropyl phosphate | | | | | 5 | |
| Organotin mercaptide [5] | | | | | | 1 |
| Organotin maleate [6] | | | | | | 0.5 |
| Flame time (seconds) | 195 | 121 | 50 | 51 | 36 | 1 |
| Char length (inches) | 12 | 6¾ | 4 | 3¾ | 2 | 1¾ |

NOTE.—See footnotes at end of tables in column 8.

This example demonstrates the self-extinguishing power of the agents taught by this invention over identical formulations without any self-extinguishing agent and with antimony oxide, tetra bromobisphenol, perchloropentacyclodecane, and tris (2,3)-dibromopropyl phosphate-self-extinguishing agents of the prior art.

EXAMPLE 2

A low molecular weight polyvinyl chloride resin was compounded with self-extinguishing agents of this invention, various impact-modifying resins, and other materials according to the formulas below, calendered into 30 mil sheets, and subjected to flame tests. The results of the flame tests are shown below:

| | A | B | C | D |
|---|---|---|---|---|
| PVC resin [1] | 70 | → | → | → |
| Lubricant [4] | 1 | → | → | → |
| Pigment [7] | 8 | → | → | → |
| Organotin mercaptide [5] | 1 | → | → | → |
| Organotin maleate [6] | 1 | → | → | → |
| Acrylic resin impact modifier [8] | 30 | | | |
| Chlorinated polyethylene impact modifier [9] | | 30 | | |
| Methyl methacrylate, butadiene, styrene impact modifier [10] | | | 30 | |
| Acrylonitrile, butadiene, styrene impact modifier [11] | | | | 30 |
| Flame time (seconds) | 3.9 | 1 | 1 | 1 |
| Char length (inches) | 1¾ | 1½ | 1½ | 1½ |

NOTE.—See footnotes at end of tables in column 8.

This example shows that the self-extinguishing agents of this invention may be used in PVC based resins utilizing a wide range of impact-modifying resins.

EXAMPLE 3

Polyvinyl chloride resins of various molecular weights were compounded with ABS impact-modifying resins, self-extinguishing agents of this invention and other materials according to the formulas below, calendered into 30 mil sheets, and subjected to flame tests. The results of the flame tests are shown below:

|  | A | B | C |
|---|---|---|---|
| Low MW PVC resin [13] | 70 | | |
| Medium MW PVC resin [14] | | 70 | |
| High MW PVC resin [15] | | | 70 |
| ABS resin [16] | 15 | → | → |
| ABS resin [17] | 15 | → | → |
| Lubricant [4] | 1 | → | → |
| Pigment [7] | | → | → |
| Organotin mercaptide [5] | 1 | → | → |
| Organotin maleate [6] | 1 | → | → |
| Flame time (seconds) | 1 | 1 | 1 |
| Char length (inches) | 1¾ | 1½ | 1½ |

NOTE.—See footnotes at end of tables in column 8.

This example demonstrates that the self-extinguishing agents of this invention may be used with PVC resins from a wide range of molecular weights.

EXAMPLE 4

A low molecular weight polyvinyl chloride resin was compounded with acrylonitrile-butadiene-styrene (ABS) impact-modifying resins, self-extinguishing agents of this invention, and other materials according to the formulas below, calendered into sheets of various thicknesses, and subjected to flame tests. The results of the flame tests are shown below:

|  | A | B | C | D | E | F | G |
|---|---|---|---|---|---|---|---|
| PVC resin [1] | 70 | → | → | → | → | → | → |
| ABS resin [16] | 15 | → | → | → | → | → | → |
| ABS resin [17] | 15 | → | → | → | → | → | → |
| Organotin mercaptide [5] | 1 | → | → | → | → | → | → |
| Organotin maleate [6] | 1 | → | → | → | → | → | → |
| Lubricant [4] | 1 | → | → | → | → | → | → |
| Pigment [7] | 8 | → | → | → | → | → | → |
| Sheet thickness (mils) | 5 | 10 | 15 | 20 | 25 | 30 | 40 |
| Flame time (seconds) | 18.2 | 36.6 | 60.8 | 1.0 | 1.0 | 1.0 | 1.0 |
| Char length (inches) | 9 | 6 | 5 | 2 | 1½ | 1¾ | 1¾ |

NOTE.—See footnotes at end of tables in column 8.

This example demonstrates the effectiveness of the self-extinguishing agents of this invention in PVC based resins formed into sheets of 20 mil thickness and greater.

EXAMPLE 5

A low molecular weight polyvinyl chloride resin was compounded with various amounts of acrylonitrile-butadiene-styrene (ABS) impact-modifying resin, self-extinguishing agents of this invention, and other materials according to the formulas below, calendered into 30 mil sheets, and subjected to flame tests. The results of the flame tests are shown below:

|  | A | B | C | D | E | F | G |
|---|---|---|---|---|---|---|---|
| PVC resin [1] | 70 | → | → | → | → | 40 | 40 |
| ABS resin [16] | 5 | 10 | 15 | 20 | 25 | 30 | 30 |
| ABS resin [17] | 5 | 10 | 15 | 20 | 25 | 30 | 30 |
| Organotin mercaptide [5] | 1.25 | 1.11 | 1.00 | 0.91 | 0.83 | 1.0 | 1.0 |
| Organotin maleate [6] | 1.25 | 1.11 | 1.00 | 0.91 | 0.83 | 1.0 | 1.0 |
| Stannous oxide | | | | | | 3.0 | 5.0 |
| Lubricant [4] | 1 | → | → | → | → | → | → |
| Pigment [7] | 8 | → | → | → | → | → | → |
| Flame time (seconds) | 1 | 1 | 1 | 1 | 1 | 1 | 1.4 |
| Char length (inches) | 1½ | 1¼ | 1½ | 1¾ | 1¾ | 1¾ | 2 |

NOTE.—See footnotes at end of tables in column 8.

This example demonstrates the effectiveness of the self-extinguishing agents of this invention when used with impact-modifying resins in amounts up to about 60 parts/100 parts (polyvinyl chloride and impact-modifying) resins. The data of Formulas F and G indicate that higher amounts of impact-modifying resins may be tolerated by raising the amount of stannous oxide.

EXAMPLE 6

A low molecular weight polyvinyl chloride resin was compounded with an ABS impact-modifying resin, self-extinguishing agents of this invention, and other materials according to the formulas below, calendered into 30 mil sheets, and subjected to flame tests. The results of the flame tests are shown below:

|  | A | B | C | D | E | F | G | H | I |
|---|---|---|---|---|---|---|---|---|---|
| PVC resin [1] | 70 | 70 | | | | | | | |
| ABS resin [16] | 30 | 15 | 15 | 30 | 30 | 15 | | | |
| ABS resin [17] | | 15 | 15 | | | 15 | | | |
| Lubricant [4] | 1 | → | → | → | → | → | → | → | → |
| Pigment [7] | | | 8 | 8 | | | 8 | | |
| Organotin mercaptide [5] | 0.5 | 2 | | 2.5 | | | 1 | 0.5 | 0.33 | 0.17 |
| Organotin maleate [6] | 1 | | 2 | | 2.5 | 1 | 1.5 | 1.67 | 1.83 |
| Flame time (seconds) | 1.4 | 1 | 1 | 1 | 1.2 | 1 | 1 | 1 | 1 |
| Char length (inches) | 1¾ | 1¼ | 1½ | 2 | 2 | 1¾ | 1½ | 1¼ | 1½ |

[1] Vgyen 85®, The General Tire & Rubber Company.
[2] Blendex 121®, The Marbon Chemical Company.
[3] Dyphos XL®, National Lead Company.
[4] Calcium stearate.
[5] The reaction product of dibutyl tin oxide and 3-mercapto propionic acid.
[6] Di-butyl-tin maleate.
[7] TiO₂·RA.
[8] Acryloid 607®, Rohm & Haas Company.
[9] Tyrin 16®, The Dow Chemical Company.
[10] Sicoflex MBS®, Mazzucchelli Celluloide S.P.A. (Italy).
[11] Cycolac GSE–1000®, The Marbon Chemical Company.
[13] Vygen 65®, The General Tire & Rubber Company.
[14] Vygen 105®, The General Tire & Rubber Company.
[15] Vygen 123®, The General Tire & Rubber Company.
[16] Kralastic 2540®, U.R. Rubber Company.
[17] Kralastic 3100®, U.S. Rubber Company.

This example demonstrates the effectiveness of the self-extinguishing agents of this invention when used alone and in various combinations and mixtures.

What is claimed is:

1. A method of improving the self-extinguishing flame properties of a polyvinyl chloride resin, that is compounded with conventional compounding ingredients including at least one impact-strength modifying resin, but in the absence of any substantial amount of conventional flame retardants, so that a 30 mil thick sheet of said impact-modified resin would normally exhibit greater than about a 30 second flame time subsequent to holding a sample of said sheet of resin vertically in a primary flame for 12 seconds, comprising adding to said polyvinyl chloride resin a compound that is the reaction product of dibutyl tin oxide and 3-mercapto propionic acid in an amount of at least 1.5 parts per 100 parts of the total of polyvinyl chloride and impact modifying resins.

References Cited
UNITED STATES PATENTS

| 2,888,435 | 5/1959 | Wallace | 260—45.75 |
| 2,956,980 | 10/1960 | Law | 260—45.75 |
| 3,085,082 | 4/1963 | Baer et al. | 260—45.75 |
| 3,208,969 | 9/1965 | Quattlebaum et al. | 260—45.75 |
| 3,316,192 | 4/1967 | Seibel | 260—45.75 |
| 3,350,333 | 10/1967 | Beer et al. | 260—45.75 |
| 3,398,114 | 8/1968 | Pollock | 260—45.75 |
| 3,435,098 | 3/1969 | Watanabe et al. | 260—45.75 |
| 3,467,732 | 9/1969 | Schnebelen et al. | 260—45.75 |
| 3,475,361 | 10/1969 | Garner | 260—45.75 |
| 3,479,315 | 11/1969 | Weisfeld | 260—45.75 |

JOHN C. BLEUTGE, Primary Examiner

U.S. Cl. X.R.

260—45.75 K, 876 R, 897 C, 899, Digest 24